United States Patent
Song et al.

(10) Patent No.: US 10,530,166 B2
(45) Date of Patent: Jan. 7, 2020

(54) BATTERY MANAGEMENT APPARATUS, AND BATTERY PACK AND VEHICLE INCLUDING THE SAME

(71) Applicant: LG Chem, Ltd., Seoul (KR)

(72) Inventors: Hyeon-Jin Song, Daejeon (KR); Seon-Uk Yu, Daejeon (KR); Yang-Lim Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/127,398

(22) Filed: Sep. 11, 2018

(65) Prior Publication Data

US 2019/0097438 A1    Mar. 28, 2019

(30) Foreign Application Priority Data

Sep. 25, 2017 (KR) .................. 10-2017-0123461

(51) Int. Cl.
*H02J 7/00* (2006.01)
*H02J 7/14* (2006.01)
*B60L 3/00* (2019.01)
*B60L 58/21* (2019.01)
*B60K 6/28* (2007.10)

(52) U.S. Cl.
CPC .............. *H02J 7/0026* (2013.01); *B60L 3/00* (2013.01); *B60L 58/21* (2019.02); *B60K 6/28* (2013.01); *B60Y 2200/91* (2013.01); *B60Y 2200/92* (2013.01); *B60Y 2400/112* (2013.01)

(58) Field of Classification Search
USPC ........................................ 320/112, 132, 134
See application file for complete search history.

(56) References Cited

U.S. PATENT DOCUMENTS

| 6,002,221 A * | 12/1999 | Ochiai ................. B60L 3/0023 318/139 |
| 6,798,175 B2 * | 9/2004 | Hanada ................. H02H 9/001 320/164 |
| 2008/0100298 A1 * | 5/2008 | Yun ..................... G01R 31/3662 324/430 |
| 2009/0128158 A1 * | 5/2009 | Kawai .................. B60L 3/0046 324/433 |

(Continued)

FOREIGN PATENT DOCUMENTS

| JP | 2006230163 A | 8/2006 |
| JP | 6020388 B2 | 11/2016 |

(Continued)

*Primary Examiner* — Alexis B Pacheco
(74) *Attorney, Agent, or Firm* — Lerner, David, Littenberg, Krumholz & Mentlik, LLP

(57) ABSTRACT

Disclosed is a battery management apparatus, which includes: a pre-charging unit having a plurality of switches and connected to the first main relay in parallel, the pre-charging unit being connected between the second main relay and the second charging/discharging terminal; a control unit configured to control the plurality of switches so that an output voltage of the battery module is reduced to a reduced voltage and output between the first charging/discharging terminal and the second charging/discharging terminal; and a diagnosing unit configured to diagnose a connection state in the load based on a load current value of the current flowing in the load to which the reduced voltage is applied.

10 Claims, 5 Drawing Sheets

(56) References Cited

U.S. PATENT DOCUMENTS

| | | | | |
|---|---|---|---|---|
| 2010/0127663 A1* | 5/2010 | Furukawa | B60L 3/0046 320/134 |
| 2011/0006726 A1* | 1/2011 | Dittmer | B60L 3/0007 320/101 |
| 2011/0316489 A1* | 12/2011 | Norimatsu | H02M 1/36 320/166 |
| 2012/0251866 A1* | 10/2012 | Matejek | B60L 3/0046 429/123 |
| 2013/0175857 A1* | 7/2013 | Shreevani | B60L 3/0023 307/9.1 |
| 2013/0249283 A1* | 9/2013 | Yokoyama | H01M 10/44 307/10.1 |
| 2014/0132226 A1* | 5/2014 | Sakamoto | H02J 7/007 320/166 |
| 2014/0197683 A1* | 7/2014 | Migita | B60L 3/0046 307/9.1 |
| 2014/0203735 A1* | 7/2014 | Sugiyama | H02J 5/00 318/139 |
| 2015/0251542 A1* | 9/2015 | Mensah-Brown | B60L 11/005 307/10.1 |
| 2018/0043783 A1* | 2/2018 | Tabatowski-Bush | B60L 11/1803 |
| 2018/0043847 A1* | 2/2018 | Burkman | B60L 1/00 |
| 2018/0309172 A1* | 10/2018 | Ito | H01M 10/443 |

FOREIGN PATENT DOCUMENTS

| | | | | |
|---|---|---|---|---|
| KR | 20080039669 A | * | 5/2008 | H01M 10/48 |
| KR | 101091636 B1 | | 12/2011 | |
| KR | 20120132336 A | * | 12/2012 | H01M 10/0445 |
| KR | 101273820 B1 | | 6/2013 | |
| KR | 20140025627 A | * | 3/2014 | H01M 10/42 |
| KR | 20180023364 A | | 3/2018 | |
| WO | WO-2012081330 A1 | * | 6/2012 | H01M 10/44 |

* cited by examiner

BATTERY MANAGEMENT APPARATUS, AND BATTERY PACK AND VEHICLE INCLUDING THE SAME

TECHNICAL FIELD

The present application claims priority to Korean Patent Application No. 10-2017-0123461 filed on Sep. 25, 2017 in the Republic of Korea, the disclosures of which are incorporated herein by reference.

The present disclosure relates to a battery management apparatus, and a battery pack and a vehicle including the same, and more particularly, to a battery management apparatus for performing pre-charging when a battery pack outputs and diagnosing a connection state in a load connected to the battery pack, and a battery pack and a vehicle including the same.

BACKGROUND ART

Secondary batteries, which are easy to apply to various product groups and have good electrical energy characteristics such as high energy density, are widely used for electric vehicles (EVs) or hybrid vehicles (HVs), driven by electric driving sources, as well as portable devices.

The secondary batteries are capable of repeatedly charging and discharging by electrochemical reactions, which may reduce the use of fossil fuels drastically, and also generate no by-products due to the use of energy. For this reason, the secondary batteries are attracting attention as a new environment-friendly energy source for improving energy efficiency.

Generally, an assembly includes a plurality of unit assembly secondary cells, and a battery pack applied to a vehicle or the like includes a plurality of the assemblies or battery modules. The cell includes an electrode current collector, a separator, an active material, an electrolyte, an aluminum thin film layer and the like and allows charging and discharging by an electrochemical reaction among the components.

The battery pack has a problem of low safety while having excellent electrical characteristics. For example, when a lithium secondary battery is used, a decomposition reaction may occur at the components of the battery such as the active material and the electrolyte in an abnormal operation state such as overcharge, overdischarge, exposure to high temperature, short circuit or the like, thereby generating heat and gas. The high-temperature and high-pressure condition caused by the heat and gas may promote the decomposition reaction, which may lead to ignition or explosion.

In particular, when a shock caused by a vehicle collision is applied the battery pack used in a vehicle, the battery pack may be ignited or exploded due to the shock, and the generated fire may lead to a vehicle fire.

To solve this problem, there is a demand for a technology for controlling the output and electric flow of a battery pack so that ignition or explosion does not occur from the battery pack when a collision accident occurs at a vehicle to which the battery pack is applied.

DISCLOSURE

Technical Problem

The present disclosure is directed to providing a battery management apparatus, which may reduce an output voltage of a battery module to a reduced voltage and output the reduced voltage to a load to diagnose a connection state in the load based on a load current value of the current flowing in the load, and a battery pack and a vehicle including the same.

Also, the present disclosure is directed to providing a battery management apparatus, which may perform pre-charging by charging a charging voltage value of an output capacitor to a voltage value lower than a voltage value of the output voltage by using the output voltage of the battery module, and a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery management apparatus which may be provided in a battery pack that includes a battery module, a first charging/discharging terminal connected to a load, a second charging/discharging terminal connected to the load, a first main relay connected between a positive electrode terminal of the battery module and the first charging/discharging terminal, and a second main relay connected between a negative electrode terminal of the battery module and the second charging/discharging terminal.

Preferably, the battery management apparatus may comprise: a pre-charging unit having a plurality of switches and connected to the first main relay in parallel, the pre-charging unit being connected between the second main relay and the second charging/discharging terminal; a control unit configured to control the plurality of switches so that an output voltage of the battery module is reduced to a reduced voltage and output between the first charging/discharging terminal and the second charging/discharging terminal; and a diagnosing unit configured to diagnose a connection state in the load based on a load current value of the current flowing in the load to which the reduced voltage is applied.

Preferably, the pre-charging unit may include: a first switch having one end connected to a first node between the first main relay and the positive electrode terminal; a second switch having one end connected to the other end of the first switch; an inductor having one end connected to the other end of the second switch and having the other end connected to a second node between the first main relay and the first charging/discharging terminal; and a third switch having one end connected to a third node between the first switch and the second switch and having the other end connected to a fourth node between the second main relay and the second charging/discharging terminal.

Preferably, in a state where the first main relay is controlled to an OFF state and the second main relay is controlled to an ON state, the control unit may control the second switch to an ON state and then alternately control the first switch and the third switch to an ON state and an OFF state repeatedly so that the output voltage of the battery module is reduced to the reduced voltage.

Preferably, when the reduced voltage is applied to the load, the diagnosing unit may compare the load current value with a preset reference current range and diagnose that the connection in the load is cut if the load current value is included in the preset reference current range as a result of the comparison.

Preferably, the battery management apparatus may further comprise a diagnosis resistance unit connected between the second main relay and the second charging/discharging terminal.

Preferably, the diagnosing unit may diagnose the connection state in the load based on the change of a voltage value at both ends of the diagnosis resistance unit.

Preferably, the diagnosing unit may diagnose that the connection state in the load is abnormal if the voltage value at both ends at an early stage where the reduced voltage is applied to the load is reduced over a preset reduction rate.

Preferably, the control unit may control the plurality of switches so that a reduced voltage value of the reduced voltage output between the first charging/discharging terminal and the second charging/discharging terminal maintains a preset reference voltage value.

A battery pack according to the present disclosure may include the battery management apparatus.

A vehicle according to the present disclosure may include the battery management apparatus.

Advantageous Effects

According to the present disclosure, it is possible to protect the battery pack from a load having a fault in a connection state by reducing an output voltage of a battery module to a reduced voltage, outputting the reduced voltage to a load and diagnosing a connection state in the load based on a load current value of the current flowing in the load.

Also, in the present disclosure, it is possible to protect a main relay and a load from a surging current by performing pre-charging by charging a charging voltage value of an output capacitor to a voltage value lower than a voltage value of the output voltage by using the output voltage of the battery module.

BEST MODE

Figure 1:
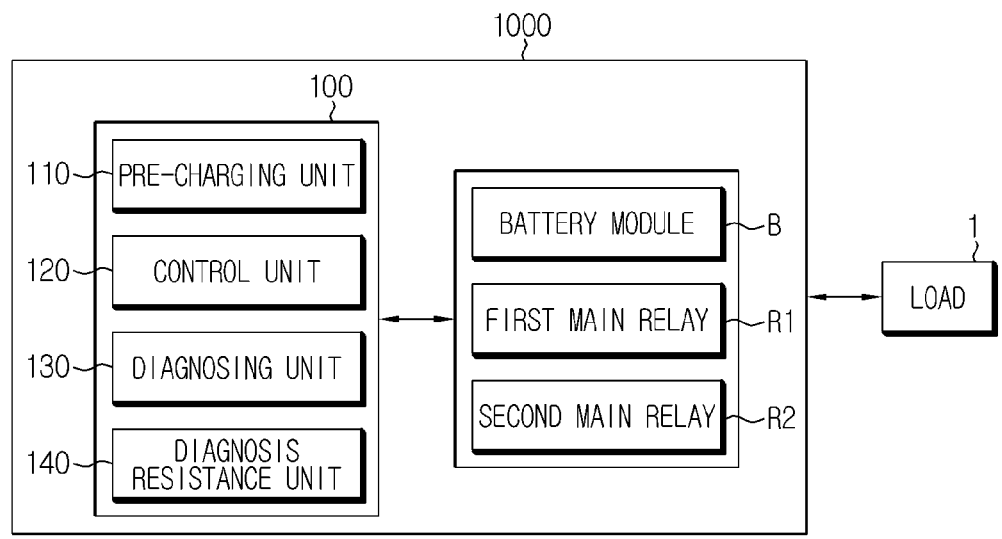
FIG. 1 is a diagram schematically showing the configuration of a battery management apparatus and a battery pack including the same according to an embodiment of the present disclosure.

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 2:
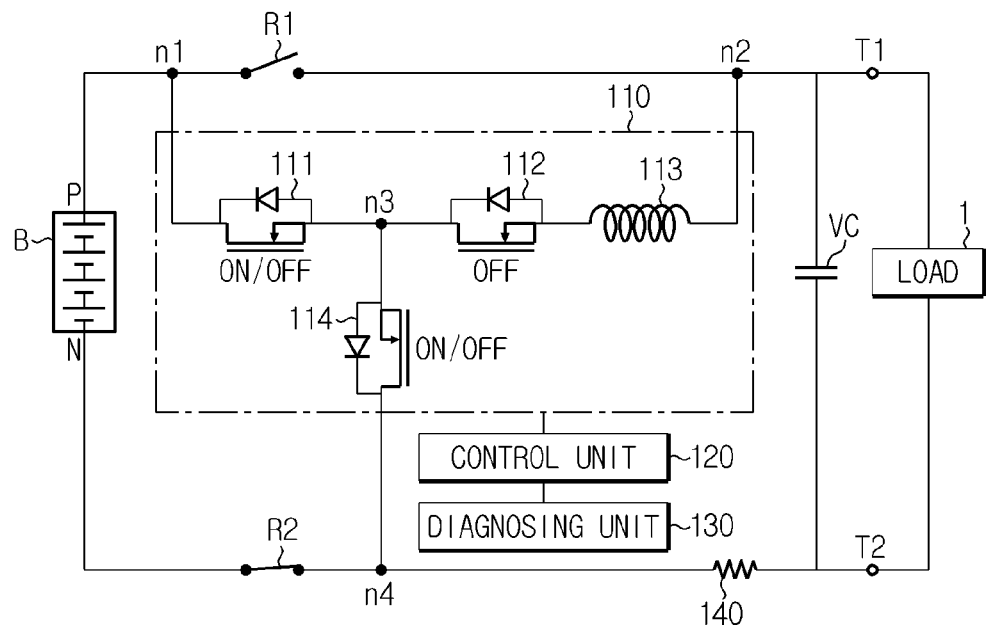
FIG. 2 is a circuit diagram schematically showing the configuration and circuit connection of the battery management apparatus and the battery pack including the same according to an embodiment of the present disclosure.

FIG. 1 is a diagram schematically showing the configuration of a battery management apparatus 100 and a battery pack 1000 including the same according to an embodiment of the present disclosure, and FIG. 2 is a circuit diagram schematically showing the configuration and circuit connection of the battery management apparatus 100 and the battery pack 1000 including the same according to an embodiment of the present disclosure.

Referring to FIGS. 1 and 2, the battery management apparatus 100 according to an embodiment of the present disclosure may be included in a battery pack 1000, and the battery pack 1000 may include a battery module B, a first charging/discharging terminal T1, a second charging/discharging terminal T2, an output capacitor VC connected between the first charging/discharging terminal T1 and the second charging/discharging terminal T2, a first main relay R1 connected between a positive electrode terminal P of the battery module B and the first charging/discharging terminal T1, and a second main relay R2 connected between a negative electrode terminal N of the battery module B and the second charging/discharging terminal T2.

Meanwhile, a load 1 may be connected between first charging/discharging terminal T1 and the second charging/discharging terminal T2 to supply the power of the battery pack 1000 to the load 1.

For this, the first main relay R1 may be controlled to change its connection state to an ON state or an OFF state to change the electric connection between the positive electrode terminal P of the battery module B and the first charging/discharging terminal T1.

In addition, the second main relay R2 may be controlled to change its connection state to an ON state or an OFF state to change the electric connection between the negative electrode terminal N of the battery module B and the second charging/discharging terminal T2.

The battery management apparatus 100 included in the battery pack 1000 according to an embodiment of the present disclosure may diagnose the connection state in the load 1 connected to the first charging/discharging terminal T1 and the second charging/discharging terminal T2 and perform pre-charging when the battery pack 1000 is outputting.

Hereinafter, a process of diagnosing a connection state and performing pre-charging by the battery management apparatus 100 according to an embodiment of the present disclosure will be described.

The battery management apparatus 100 according to an embodiment of the present disclosure may include a pre-charging unit 110, a control unit 120, a diagnosing unit 130 and a diagnosis resistance unit 140.

The pre-charging unit 110 may include a plurality of switches 111, 112, 114 and an inductor 113, be connected to the first main relay R1 in parallel, and be connected between the second main relay R2 and the second charging/discharging terminal T2.

More specifically, the pre-charging unit 110 may include a first switch 111, a second switch 112, an inductor 113 and a third switch 114.

The first switch 111 may have one end connected to a first node n1 between the first main relay R1 and the positive electrode terminal P.

The second switch 112 may have one end connected to the other end of the first switch 111.

The inductor 113 may have one end connected to the other end of the second switch 112 and may have the other end connected to a second node n2 between the first main relay R1 and the first charging/discharging terminal T1.

The third switch 114 may have one end connected to a third node n3 between the first switch 111 and the second switch 112 and may have the other end connected to a fourth node n4 between the second main relay R2 and the second charging/discharging terminal T2.

In other words, the first switch 111, the second switch 112 and the inductor 113 may be serially connected in order and connected to the first main relay R1 in parallel, and the third switch 114 may be connected between the third node n3 and the fourth node n4.

In an embodiment, the plurality of switches 111, 112, 114 included in the pre-charging unit 110 may be MOSFETs. In this way, the control unit 120 may rapidly control the operation states of the plurality of switches 111, 112, 114.

The operation states of the plurality of switches 111, 112, 114 provided in the pre-charging unit 110 may be controlled by the control unit 120.

More specifically, the control unit 120 may control the operation states of the plurality of switches 111, 112, 114 provided in the pre-charging unit 110 in response to a command signal input from the diagnosing unit 130. By doing so, the control unit 120 may control the operation states of the plurality of switches 111, 112, 114 provided in the pre-charging unit 110 so that the output voltage of the battery module B is reduced to a reduced voltage and output to the first charging/discharging terminal T1 and the second charging/discharging terminal T2.

The control unit 120 according to an embodiment may receive power and start operation when a connection state diagnosing command signal for diagnosing a connection state in the load 1 is received from the diagnosing unit 130.

More specifically, as shown in FIG. 2, in order to diagnose the connection state in the load 1, the diagnosing unit 130 may control the operation state of the second main relay R2 to an ON state, control the operation state of the first main relay R1 to an OFF state and then send the connection state diagnosing command signal to the control unit 120.

After that, as shown in FIG. 2, the control unit 120 may control the second switch 112 to an ON state in response to the connection state diagnosing command signal and alternately control the first switch 111 and the third switch 114 to an ON state and an OFF state repeatedly.

At this time, the operation state of the first main relay R1 may be an OFF state, and the operation state of the second main relay R2 may be an ON state.

In other words, if the connection state diagnosing command signal is received, the control unit 120 may control the second switch 112 to an ON state and control the first switch 111 and the third switch 114 to alternately come to an OFF state and an ON state repeatedly.

Figure 3:
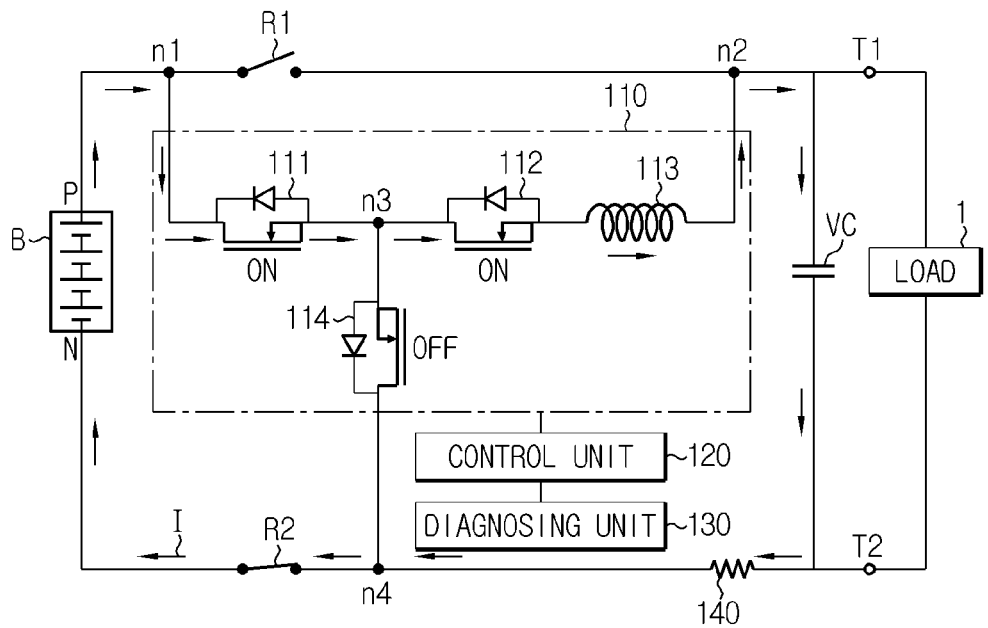
FIGS. 3 and 4 are circuit diagrams for illustrating a process of reducing an output voltage of a battery module to a reduced voltage in order to diagnose a connection state in the load, performed by the battery management apparatus according to an embodiment of the present disclosure.
Figure 4:
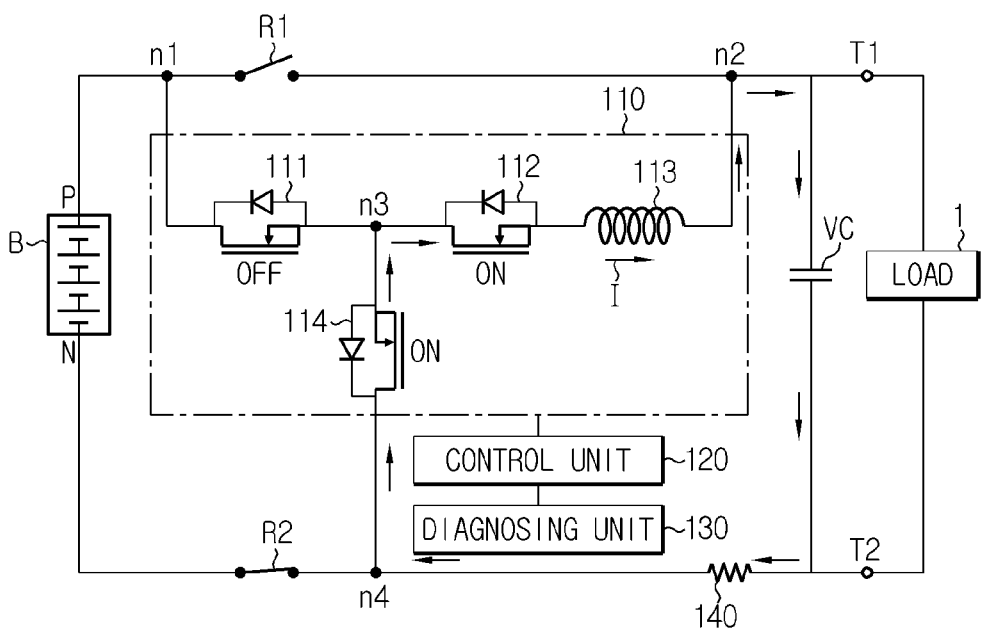

FIGS. 3 and 4 are circuit diagrams for illustrating a process of reducing an output voltage of a battery module to a reduced voltage in order to diagnose a connection state in the load, performed by the battery management apparatus according to an embodiment of the present disclosure.

Referring to FIGS. 3 and 4 further, the control unit 120 may control second switch 112 to an ON state as shown in FIG. 3 and then control the first switch 111 and the third switch 114 to an ON state and an OFF state, respectively.

Accordingly, the output voltage of the battery module B is applied to a closed circuit where the first switch 111, the second switch 112, the inductor 113, the output capacitor VC and the second main relay R2 are serially connected in order, so that the inductor 113 and the output capacitor VC are charged.

On the contrary, as shown in FIG. 4, the control unit 120 may control the second switch 112 to an ON state and then control the first switch 111 and the third switch 114 to an OFF state and an ON state, respectively.

Accordingly, the circuit to which the positive electrode terminal P and the negative electrode terminal N of the battery module B are connected is opened to configure a closed circuit where the second switch 112, the inductor 113, the output capacitor VC and the third switch 114 are serially connected in order, and the power charged to the inductor 113 may be charged to the output capacitor VC in the closed circuit.

At this time, the control unit 120 may be configured to control the period where the first switch 111 and the third switch 114 change to an ON state and an OFF state so that a reduced voltage value of the reduced voltage maintains a preset reference voltage value.

In other words, the control unit 120 may reduce the output voltage output from the battery module B to a reduced voltage having a preset reference voltage value.

Accordingly, if the control unit 120 controls the operation states of the first switch 111 and the third switch 114 in response to the connection state diagnosing command signal, the reduced voltage having the preset reference voltage value may be output to the first charging/discharging terminal T1 and the second charging/discharging terminal T2.

In addition, if the control unit 120 controls the operation states of the first switch 111 and the third switch 114 in response to the connection state diagnosing command signal, the charging voltage having the preset reference voltage value may be charged to the output capacitor VC connected to the first charging/discharging terminal T1 and the second charging/discharging terminal T2.

If the charging voltage having the preset reference voltage value is charged to the output capacitor VC, the control unit 120 may control the operation states of the first switch 111, the second switch 112 and the third switch 114 to an OFF state.

After that, if the charging voltage lower than the preset reference voltage value is charged to the output capacitor VC, the control unit 120 may charge the output capacitor VC by switch control as described above so that the charging voltage of the charged capacitor VC may maintain the preset reference voltage value.

For example, the output voltage output from the battery module B may have a voltage value of 400V, and the preset reference voltage value may be 40V.

Accordingly, when diagnosing the connection state in the load 1, the battery management apparatus 100 according to the present disclosure may output a low voltage to the load 1 without outputting a high output voltage to the load 1 to prevent the load 1 from being damaged during the diagnosing process due to the application of a high voltage.

Meanwhile, the diagnosing unit 130 may diagnose the connection state in the load 1 based on the load current value of the current flowing in the load 1 to which the reduced voltage is applied.

More specifically, when the reduced voltage having the preset reference voltage value is applied to the load 1, the diagnosing unit 130 may compare the load current value with the preset reference current range and diagnose that the connection in the load 1 is cut if the load current value is included in the preset reference current range as a result of the comparison.

Here, if the connection in the load 1 is cut, the resistance component in the load 1 increases infinitely, and accordingly, at the load 1 to which the reduced voltage having the preset reference voltage value is applied, the current does not flow or only a minute current may flow.

By using the above, the preset reference current range may be 0.01V or below.

In other words, when the current having a load current value included in the preset reference current range flows in the load 1 to which a voltage is applied from the output capacitor VC charged with the reduced voltage having the preset reference voltage value, the diagnosing unit 130 may diagnose that the connection in the load 1 is cut.

In addition, if the diagnosing unit 130 diagnoses that the connection in the load 1 is cut, the operation states of the first main relay R1 and the second main relay R2 may be controlled to an OFF state to cut the electric connection between the battery pack 1000 and the load 1.

On the contrary, if the reduced voltage having the preset reference voltage value is applied to the load 1, the diagnosing unit 130 may compare the load current value with the preset reference current range and diagnose that the connection in the load 1 is normal if the load current value is not included in the preset reference current range as a result of the comparison.

Meanwhile, the diagnosis resistance unit 140 may be connected between the second main relay R2 and the second charging/discharging terminal T2. For example, the diagnosis resistance unit 140 may be a resistor element of 1 ohm or below.

Accordingly, the current flowing in the load 1 may flow in the diagnosis resistance unit 140.

In other words, the same current as the current flowing in the load 1 to which the reduced voltage having the preset reference voltage is applied may flow in the diagnosis resistance unit 140.

At this time, the diagnosing unit 130 may diagnose the connection state in the load 1 based on the change of voltage value at both ends of the diagnosis resistance unit 140.

More specifically, if the voltage value at both ends at an early state where the reduced voltage is applied to the load 1 is reduced over a preset reduction rate, the diagnosing unit 130 may diagnose that the connection state in the load 1 is abnormal.

For example, if the connection in the load 1 is not cut and the connection state becomes abnormal to generate a resistance component in the load 1, the reduced voltage may be distributively applied to the generated resistance component.

Accordingly, if the connection in the load 1 is not cut and the connection state becomes abnormal to generate a resistance component in the load 1, a voltage lower than the early stage where the reduced voltage is applied may be applied to the diagnosis resistance unit 140.

By using this, the diagnosing unit 130 may diagnose that the connection state in the load 1 is abnormal, if the voltage value at both ends at the early stage where the reduced voltage is applied to the load 1 is reduced over the preset reduction rate. Here, the preset reduction rate may be 80%. For example, if the voltage value at both ends is 5V at the early stage where the reduced voltage is applied to the load 1 and the voltage value at both ends is reduced to 1V, the reduction rate of the voltage value at both ends is 80%, and thus the diagnosing unit 130 may diagnose that the connection state in the load 1 is abnormal.

Meanwhile, if the diagnosing unit 130 diagnoses that the connection state in the load 1 is abnormal, the operation states of the first main relay R1 and the second main relay R2 may be controlled to an OFF state to cut the electric connection between the battery pack 1000 and the load 1.

Hereinafter, a process of performing pre-charging by the battery management apparatus 100 according to an embodiment of the present disclosure will be described.

FIGS. 5 to 8 are circuit diagrams for illustrating a process of controlling a plurality of switches 111, 112, 114 included in the pre-charging unit 110 so that the battery management apparatus 100 according to an embodiment of the present disclosure performs pre-charging.

Referring to FIGS. 5 to 8 further, in order to perform pre-charging, the diagnosing unit 130 may control the operation state of the second main relay R2 to an ON state and then send a pre-charging command signal for performing pre-charging to the control unit 120.

If receiving the pre-charging command signal, the control unit 120 may receive power and start operation.

Figure 5:
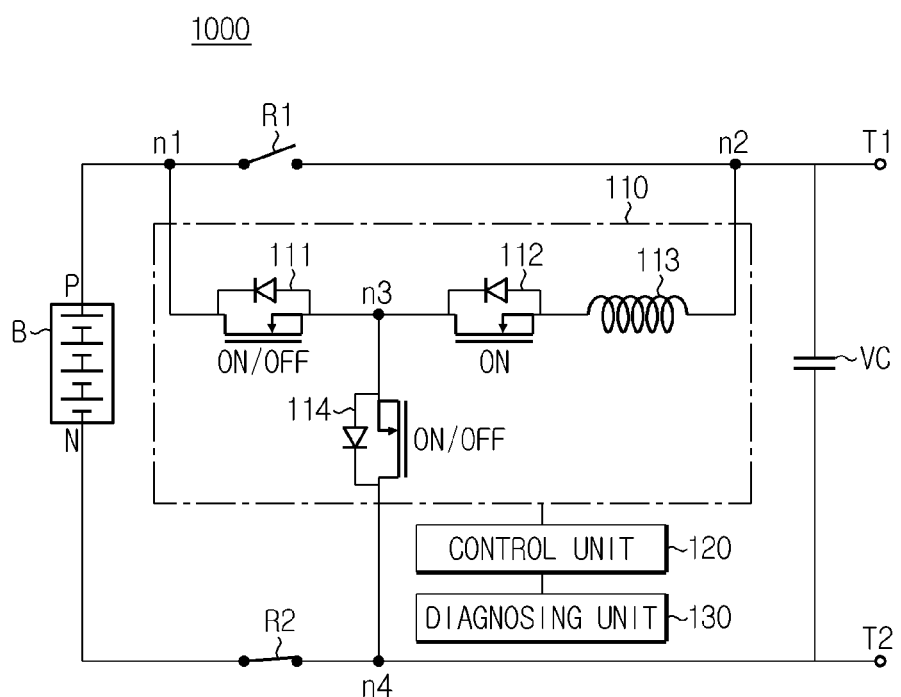
FIGS. 5 to 8 are circuit diagrams for illustrating a process of controlling a plurality of switches included in the pre-charging unit so that the battery management apparatus according to an embodiment of the present disclosure performs pre-charging.

After that, as shown in FIG. 5, the control unit 120 may control the second switch 112 to an ON state in response to the pre-charging command signal and alternately control the first switch 111 and the third switch 114 to an ON state and an OFF state repeatedly.

At this time, the operation state of the first main relay R1 may be an OFF state, and the operation state of the second main relay R2 may be an ON state.

In other words, if receiving the pre-charging command signal, the control unit 120 may control the second switch 112 to an ON state and alternately control the first switch 111 and the third switch 114 to an OFF state and an ON state repeatedly.

Figure 6:
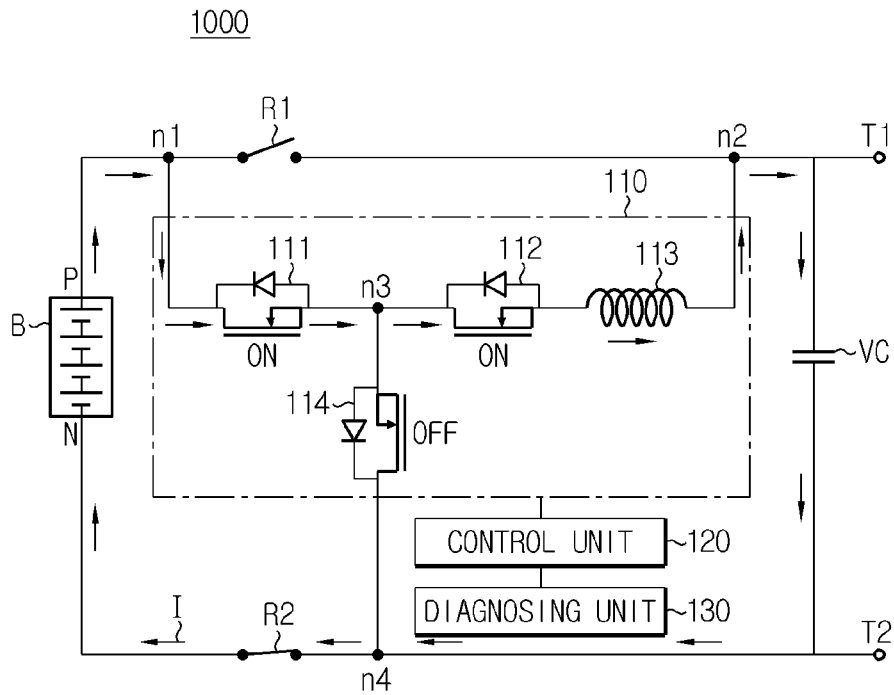

As shown in FIG. 6, the control unit 120 may control the second switch 112 to an ON state and then control the first switch 111 and the third switch 114 to an ON state and an OFF state, respectively.

Accordingly, the output voltage of the battery module B may be applied to a closed circuit where the first switch 111, the second switch 112, the inductor 113, the output capacitor VC and the second main relay R2 are serially connected in order so that the inductor 113 and the output capacitor VC are charged.

Figure 7:
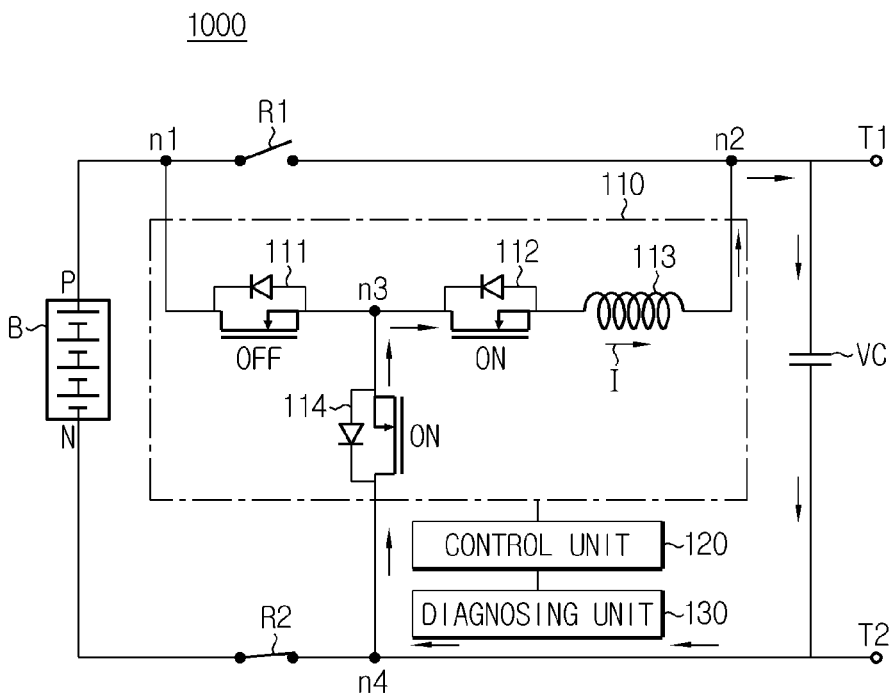
Figure 8:
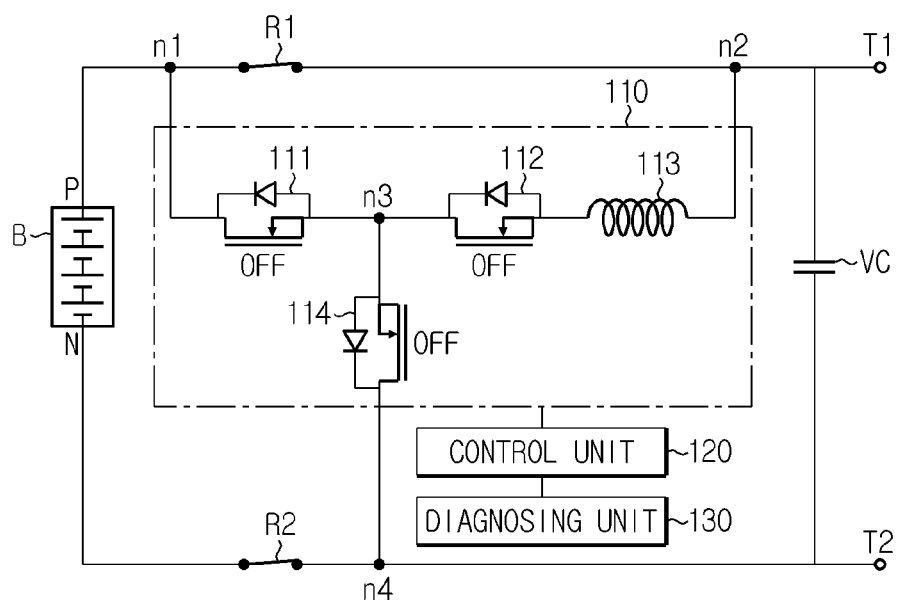

On the contrary, as shown in FIG. 7, the control unit 120 may control the second switch 112 to an ON state and then control the first switch 111 and the third switch 114 to an OFF state and an ON state, respectively.

Accordingly, the circuit to which the positive electrode terminal P and the negative electrode terminal N of the battery module B are connected is opened to configure a closed circuit where the second switch 112, the inductor 113, the output capacitor VC and the third switch 114 are serially connected in order, and the power charged to the inductor 113 may be charged to the output capacitor VC in the closed circuit.

As the control unit 120 controls the switches as above, it is possible to prevent a high voltage of the battery module B from being abruptly output to the first charging/discharging terminal T1 and the second charging/discharging terminal T2 of the battery pack 1000.

Meanwhile, if the control unit 120 repeatedly performs the above switch control, the charging voltage of the output capacitor VC may be increased slowly.

At this time, the diagnosing unit 130 may compare the charging voltage value of the output capacitor VC with a preset reference voltage value and end the pre-charging in response to the comparison result.

More specifically, if the charging voltage value is greater than the preset reference voltage value as a result of comparing the charging voltage value of the output capacitor VC with the preset reference voltage value, the diagnosing unit 130 may end pre-charging. Accordingly, if the charging voltage value exceeds the preset reference voltage value, the diagnosing unit 130 may send a pre-charging ending command to the control unit 120.

If receiving the pre-charging ending command, the control unit 120 may control the operation states of all of the plurality of switches 111, 112, 114 included in the pre-charging unit 110 to an OFF state.

At the same time, the diagnosing unit 130 may control the operation state of the first main relay R1 kept in the OFF state to an ON state to connect the positive electrode terminal P of the battery module B and the first charging/discharging terminal T1 and connect the negative electrode terminal N of the battery module B and the second charging/discharging terminal T2, so that the power of the battery pack 1000 is output to the outside.

According to this configuration of the present disclosure, by controlling the plurality of switches 111, 112, 114 configured with MOSFETs that are electromagnetic semiconductors by means of the control unit 120 generating a waveform, it is possible to shorten the time demanded for the pre-charging.

Meanwhile, the battery pack 1000 according to the present disclosure includes at least one battery module B. At this time, in addition to the battery module B, the battery pack 1000 may further include a case for accommodating the battery module B, a cartridge, a bus bar and the like. In particular, the battery pack 1000 according to the present disclosure may further include the battery management apparatus 100 described above to perform pre-charging and diagnose the connection state in the load 1.

The battery management apparatus 100 according to the present disclosure may be applied to a vehicle such as an electric vehicle or a hybrid vehicle. In other words, the vehicle according to the present disclosure may include the battery management apparatus 100 according to the present disclosure.

The present disclosure can be substituted, modified or changed in various ways without departing from the scope of the present disclosure by those skilled in the art and thus is not limited to the above embodiments and the accompanying drawings.

REFERENCE SIGNS

| 1000: battery pack | 100: battery management apparatus |
|---|---|
| 110: pre-charging unit | 120: control unit |
| 130: diagnosing unit | |

What is claimed is:

1. A battery management apparatus for managing a battery pack that includes a battery module, a first charging/discharging terminal connected to a load, a second charging/discharging terminal connected to the load, a first main relay connected between a positive electrode terminal of the battery module and the first charging/discharging terminal, and a second main relay connected between a negative electrode terminal of the battery module and the second charging/discharging terminal, the battery management apparatus comprising:

a pre-charging unit having a plurality of switches and providing a connection between the positive electrode terminal of the battery module and the first charging/discharging terminal in parallel to the first main relay, the pre-charging unit being connected between the second main relay and the second charging/discharging terminal;

a control unit configured to control the plurality of switches so that a voltage between the first charging/discharging terminal and the second charging/discharging terminal is at a reduced voltage when the positive electrode terminal of the battery module is connected to the first charging/discharging terminal by the plurality of switches, wherein the reduced voltage is less than the voltage between the first charging/discharging terminal and the second charging/discharging terminal when the positive electrode terminal of the battery module is connected to the first charging/discharging terminal by the first main relay; and a diagnosing unit configured to diagnose a connection state in the load based on a load current value of the current flowing between the first charging/discharging terminal and the second charging/discharging terminal when the positive electrode terminal of the battery module is connected to the first charging/discharging terminal by the plurality of switches.

2. The battery management apparatus according to claim 1, wherein the pre-charging unit includes:

a first switch having one end connected to a first node between the first main relay and the positive electrode terminal;

a second switch having one end connected to the other end of the first switch;

an inductor having one end connected to the other end of the second switch and having the other end connected to a second node between the first main relay and the first charging/discharging terminal; and a third switch having one end connected to a third node between the first switch and the second switch and having the other end connected to a fourth node between the second main relay and the second charging/discharging terminal.

3. The battery management apparatus according to claim 2, wherein in a state where the first main relay is controlled to an OFF state and the second main relay is controlled to an ON state, the control unit controls the second switch to an ON state and then alternately controls the first switch and the third switch to an ON state and an OFF state repeatedly so that the voltage between the first charging/discharging terminal and the second charging/discharging terminal is at the reduced voltage.

4. The battery management apparatus according to claim 1, wherein when the reduced voltage is applied to the load, the diagnosing unit compares the load current value with a preset reference current range and diagnoses that the connection in the load is cut if the load current value is included in the preset reference current range as a result of the comparison.

5. The battery management apparatus according to claim 1, further comprising:

a diagnosis resistance unit connected between the second main relay and the second charging/discharging terminal, wherein the diagnosing unit diagnoses the connection state in the load based on the change of a voltage value at both ends of the diagnosis resistance unit.

6. The battery management apparatus according to claim 5, wherein the diagnosing unit diagnoses that the connection state in the load is abnormal if the voltage value at both ends at an early stage where the reduced voltage is applied to the load is reduced over a preset reduction rate.

7. The battery management apparatus according to claim 1, wherein the control unit controls the plurality of switches so that a reduced voltage value of the reduced voltage output between the first charging/discharging terminal and the second charging/discharging terminal maintains a preset reference voltage value.

8. A battery pack comprising a battery management apparatus according to claim 1.

9. A vehicle comprising a battery management according to claim 1.

10. The battery management apparatus according to claim 1, wherein the pre-charging unit includes:
a first switch having one end connected to a first node between the first main relay and the positive electrode terminal;
a second switch having one end connected to the other end of the first switch, and the other end connected to a second node between the first main relay and the first charging/discharging terminal.

* * * * *